Aug. 12, 1969   P. GASTON   3,460,211
SPRING CLIP FOR ORNAMENTS
Filed May 14, 1968   2 Sheets-Sheet 2

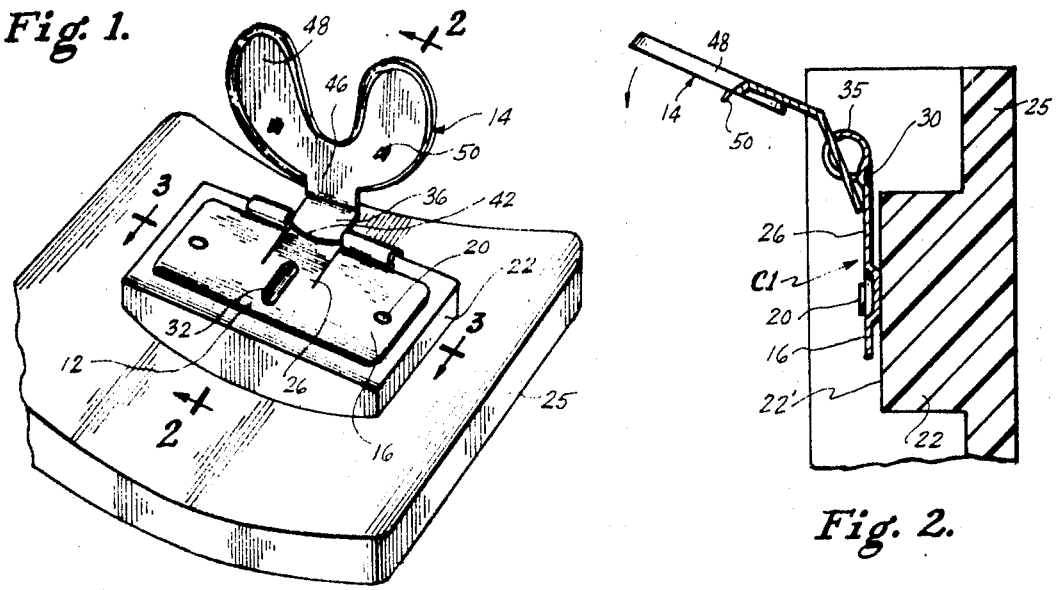
Fig. 1.
Fig. 2.
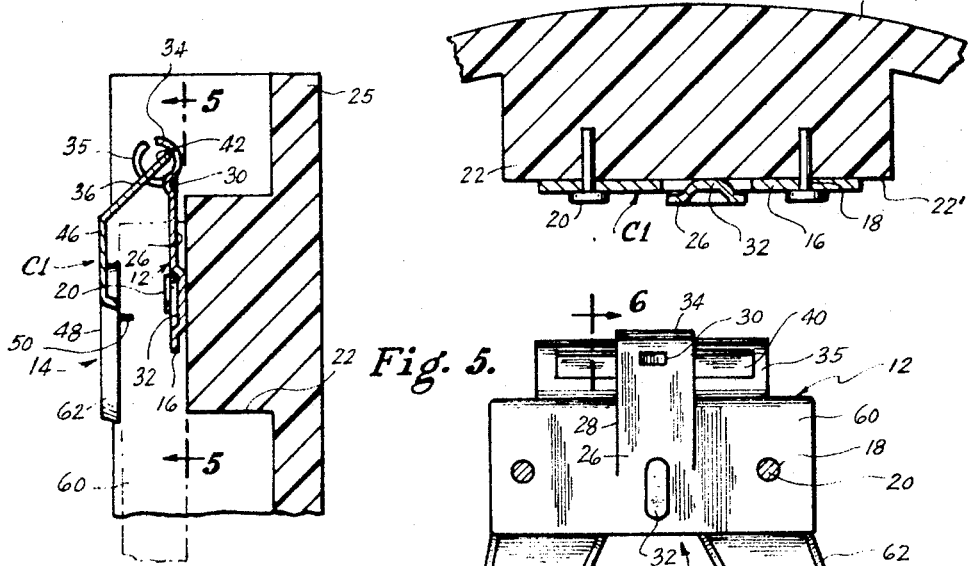
Fig. 3.
Fig. 4.
Fig. 5.
INVENTOR
PAUL GASTON
BY Polachek & Saulsbury
ATTORNEYS.

INVENTOR
PAUL GASTON

BY Polachek & Saulsbury
ATTORNEYS.

United States Patent Office 3,460,211
Patented Aug. 12, 1969

3,460,211
SPRING CLIP FOR ORNAMENTS
Paul Gaston, Rutherford, N.J., assignor to
Musi Corporation, New York, N.Y.
Filed May 14, 1968, Ser. No. 729,017
Int. Cl. A43c 11/00
U.S. Cl. 24—252                    9 Claims

ABSTRACT OF THE DISCLOSURE

A two-part hinged spring clip for mounting an ornament to the top of a shoe is described. A base part attaches to the ornament and has a spring tongue which exerts pressure on the tab of a catch part to prevent the clip from opening when in use. Bent fingers of the base part engage hinge fingers of the catch part to prevent separation of the parts. The catch part has a butterfly shape for stabilization of the ornament against movement and slippage and for maximum comfort in wear.

---

This invention concerns a spring clip for mounting an ornament to the instep of a shoe.

Heretofore in spring clips conventionally used for mounting shoe ornaments two individually spaced catches are hinged to a fixed base part. Such clips have not proven wholly satisfactory in use because they tend to open when in use under tension so that the ornament turns or slides on the upper of the shoe or even falls off. Other objections are the high cost of manufacture and time and labor involved in assembly of the many parts of the clip.

The present invention is directed at overcoming the above and other objections and advantages by providing a novel simplified, hinged two-part spring clip.

The catch part of the clip has a butterfly shape with two flanged wings which grip the inside of a shoe securely but which fit flat and comfortably against a wearer's instep. The catch part has laterally extending pivot pins integrally formed with a central tab angularly disposed to the plane of the wings. The clip has a base part formed with two curved fingers which engage the pins on opposite sides of a tensioned spring tongue. The tongue has a detent projection which engages the tab of the catch part to hold the catch part in closed pressure engagement, with the shoe upper. The tongue has an end curved oppositely from the fingers in which the pins are rotatably engaged. The curved end of the tongue bears against the tab and in cooperation with the curved fingers locks the catch pivotally to the base part so that accidental separation cannot occur. The base part has a flat or curved plate portion to fit snugly against a correspondingly shaped back of an ornament. The plate portion can be rectangular or T-shaped and provided with apertures for mounting by rivets, staples, soldering, stitches or other suitable fastening means of an ornament.

For further comprehension of the invention and of the objects and advantages thereof, reference will be had to the following description and accompanying drawings and to the appended claims in which the various novel features of the invention are more particularly set forth.

In the accompanying drawings, forming a material part of this disclosure:

FIG. 1 is a rear oblique view of an ornament on which is mounted a hinged spring clip embodying the invention, the clip being shown in open position.

FIG. 2 is a vertical central sectional view on an enlarged scale taken on line 2—2 of FIG. 1, the clip being shown open.

FIG. 3 is an enlarged cross sectional view taken on line 3—3 of FIG. 1.

FIG. 4 is a sectional view similar to FIG. 2, the clip being shown closed.

FIG. 5 is a front view of the clip in closed position, taken on line 5—5 of FIG. 4.

Figure 8:
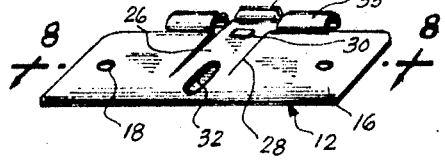
FIG. 8 is a cross sectional view taken on line 8—8 of FIG. 7.
Figure 8:
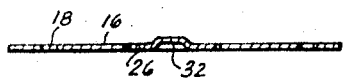

Referring first to FIGS. 1–8, there is shown a spring clip C1. The clip is made of two mutually hinged parts 12 and 14. Part 12 is generally T-shaped. It has a base plate 16 generally rectangular in form and flat as shown in FIG. 8. Base plate 16 is provided with holes 18 near its opposite ends to receive rivets, screws or other fastening members 20 which secure the base part 12 to block 22 at the rear of a plate-like shoe ornament 25.

A spring tongue 26 is integrally formed with the base plate. The plate has two spaced slits 28 from which the tongue extends upwardly above the upper edge 29 of the base plate. The tongue is formed near its upper end with a rearwardly extending projection 30 which serves as a detent function described below. A depression 32 is formed in the plate 16 and tongue 26 to stiffen the tongue where it flexes with respect to the plate and to serve as a spacer at the front side of the tongue to allow some room for the tongue to flex as shown in FIGS. 2 and 3. The free end of the tongue is formed with a curved tip 34 whose concave side faces rearwardly. Two curved fingers 35 extend upwardly from the top edge laterally of slits 28 and plate 16, and tongue 26. Concave sides of the fingers face forwardly.

Figure 6:
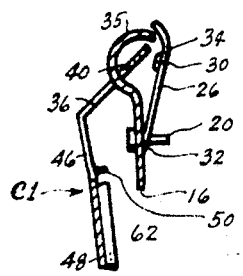
FIG. 6 is a vertical sectional view of the closed clip taken on line 6—6 of FIG. 5.
Figure 7:
FIG. 7 is an exploded perspective view showing parts of the clip of FIGS. 1–6.

The catch part 14 of the clip is generally T-shaped with a central tab 36. Extending laterally from opposite side edges 38 of the tab are two aligned pins 40 which engage pivotally or rotatably in fingers 35, as best shown in FIG. 6. The tab is just about as wide as the tongue 26 and has a downwardly extending free curved end 42 which bears against the tongue. End 42 of the tab is located below the detent projection 30 of the tongue when the catch is open as shown in FIG. 2, and is located above the detent projection in curved tip 34 when the catch is closed as shown in FIG. 4.

Bent at an angle to the tab 36 is back plate 46 of the catch part 14. This plate has two lobes or wings 48 which impart a butterfly shape to the catch part. Two prongs 50 are struck out of the wings leaving holes 52. These prongs extend forwardly when the clip is closed to engage in the material of the shoe instep 60 as shown in dotted lines in FIG. 4. Around the rim plate 46 is a flange 62 with sharp edges. The flange is bent so as to grip the material of instep 60 when the clip is closed.

Figure 9:
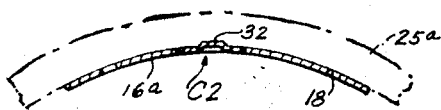
FIG. 9 is a sectional view similar to FIG. 8 showing another clip structure.

In the assembly of FIGS. 1–8, the mounting block 22 has a flat rear face 22' against which the flat forward side of flat plate 16 is abutted. The ornament 25 is curved however, with the clip C1 disposed in the concavity of the ornament. It is possible to form the base plate with an arched or bowed shape. As shown in FIG. 9, base plate 16a of clip C2 is curved. The concave side of base plate 16a fits snugly against the concave side of curved ornament 25a, shown in dotted lines. Other parts of the clip C2 with curved base plate are identical to clip C1 and are correspondingly numbered.

Figure 10:
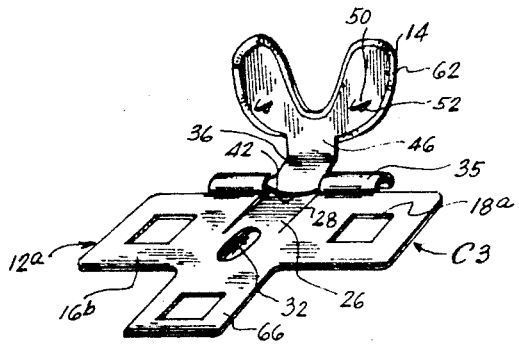
FIG. 10 is a perspective view of still another clip shown in open assembled position.

In the clip C3 shown in FIG. 10, the catch part 14 is the same as in clip C1 already described. The base part 12a is similar to base part 12 and corresponding parts are identically numbered. Base plate 16b is formed with integral tab 66 extending from the bottom edge of the plate coplanar with the remainder of the plate. Holes 18a in the tab and base plate can be used for stitching the base plate to a fabric ornament with thread. It will be noted that all holes 18 and 18a are widely spaced from the tongue 26 in clips C1, C2 and C3. Thus if the base plate is secured by solder to an ornament, the heat of soldering will not adversely effect the temper of the spring tongue 26.

In all forms of the clip, the catch part rotates on axis extending through the curved fingers 35 and oppositely curved tip 34 of the tongue 26. The arrangement is such that the catch part cannot accidentally work loose and free from the base part. The catch part cannot accidentally open or close due to the pressure exerted by the spring tongue at the detent projection 30. As the catch is opened and closed considerable force is required to snap the free end 42 of tab 36 passed to the detent projection 30. This insures secure locking of the catch part to the part of the shoe to which the ornament is attached.

Although the invention has been described in connection with a hinged spring clip for a shoe ornament, it will be understood that the clip is of general application and can be used for mounting brooches and other articles of costume jewelry to garments and the like.

The parts of the clip are inexpensively manufactured by mass production metal working processes and machinery of well known conventional types.

While I have illustrated and described the preferred embodiments of my invention it is to be understood that I do not limit myself to the precise construction herein disclosed and that various changes and modifications may be made.

What is claimed is:

1. A hinged spring clip for mounting an ornament to a support including a base part and catch part, said base part comprising an elongated base plate mountable against said ornament in a fixed position; a spring tongue integral with said base plate and extending outwardly beyond one edge of the plate, said tongue having a detent projection formed near its free end, said free end of the tongue being bent rearwardly of the tongue away from the ornament, said base plate having a pair of curved fingers extending outwardly of said one edge of the plate laterally of side edges of the tongue, said fingers being curved forwardly oppositely from the free end of the tongue; said catch part being generally T-shaped with a flat tab having integrally formed aligned pins extending laterally of side edges of the tab and rotationally engaged by said fingers, said tab having a free end contacting the tongue at the detent projection in both open and closed positions of the catch part so that the catch part is securely locked to the base part but is pivotable with respect to the base part as the free end of the tab snaps over the detent projection of the tongue; and a pair of flat lobes integrally formed with said tab and disposed in a plane angular to the tab to lie flat and smooth against the body of a wearer of the ornament when the catch part is closed.

2. A hinged spring clip as defined by claim 1, wherein said catch part has a flange bent outwardly of the plane of the lobes and peripherally thereof for engaging a part of garment on which the ornament may be worn; and prongs extending outwardly of the lobes to cooperate with the flange in stabilizing the catch part against sliding movements on said garment when the catch part is closed.

3. A hinged spring clip as defined by claim 2, wherein said base plate has parallel transverse slits formed therein and defining parts of opposite edges of the tongue so that the tongue flexes with respect to the base plate while the base plate is secured to said ornament, said base plate having apertures spaced from the tongue to receive fastener members for mounting the base plate to said ornament, said base plate having another projection formed therein for stiffening the tongue at its point of flexure on the base plate.

4. A hinged spring clip as defined by claim 1, wherein said base plate is flat for abutting a flat side of said ornament.

5. A hinged spring clip as defined by claim 1, wherein said base plate is curved for abutting a curved side of an ornament.

6. A hinged spring clip as defined by claim 1, wherein said base plate has an apertured tab extending outwardly of another edge of the base plate for securing the base part to said ornament.

7. A hinged spring clip as defined by claim 1, wherein said base plate has parralel transverse slits formed therein and defining parts of opposite edges of the tongue so that the tongue flexes with respect to the base plate while the base plate is secured to said ornament.

8. A hinged spring clip as defined by claim 7, wherein said base plate has another projection formed therein for stiffening the tongue at its point of flexure on the base plate, said other projection extending forwardly of the base plate to abut the ornament and provide room for flexure of the tongue.

9. A hinged spring clip as defined by claim 1, wherein said base plate has apertures spaced from the tongue to receive fastener members for mounting the base plate to the ornament.

References Cited

UNITED STATES PATENTS

| 736,742 | 8/1903 | Knapp | 24—120 |
| 1,439,241 | 12/1922 | Hoppe | 24—120 |
| 1,892,918 | 1/1933 | Waller | 24—252.1 |

FOREIGN PATENTS

| 426,694 | 6/1967 | Switzerland. |

DONALD A. GRIFFIN, Primary Examiner